United States Patent
Chou et al.

(10) Patent No.: US 9,906,662 B1
(45) Date of Patent: Feb. 27, 2018

(54) SCANNING DEVICE

(71) Applicant: Foxlink Image Technology Co., Ltd., New Taipei (TW)

(72) Inventors: Hung Ming Chou, New Taipei (TW); Chi Cheng Chuang, New Taipei (TW); Lung Chen, New Taipei (TW)

(73) Assignee: FOXLINK IMAGE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/455,929

(22) Filed: Mar. 10, 2017

(51) Int. Cl.
*H04N 1/04* (2006.01)
*H04N 1/00* (2006.01)

(52) U.S. Cl.
CPC ..... *H04N 1/00538* (2013.01); *H04N 1/00551* (2013.01); *H04N 1/00559* (2013.01); *H04N 1/00588* (2013.01); *H04N 1/00602* (2013.01); *H04N 1/00628* (2013.01); *H04N 2201/0081* (2013.01)

(58) Field of Classification Search
CPC .......... H04N 1/00538; H04N 1/00551; H04N 1/00559; H04N 1/00588; H04N 1/00602; H04N 1/00628; H04N 2001/0081
USPC ................................................ 358/498, 496
See application file for complete search history.

(56) References Cited

U.S. PATENT DOCUMENTS

| | | | | |
|---|---|---|---|---|
| 8,998,195 | B2* | 4/2015 | Hong | B65H 5/26 271/186 |
| 8,998,208 | B1* | 4/2015 | Hong | B65G 13/06 271/314 |
| 2012/0074641 | A1* | 3/2012 | Murata | B65H 1/266 271/10.11 |
| 2014/0110898 | A1* | 4/2014 | Hung | B65H 3/0653 271/10.11 |
| 2015/0123340 | A1* | 5/2015 | Kannari | B65H 3/0669 271/117 |

* cited by examiner

*Primary Examiner* — Cheukfan Lee
(74) *Attorney, Agent, or Firm* — WPAT, PC (57) ABSTRACT

A scanning device includes an upper cover, and a separation module detachably and changeably assembled in the upper cover. A middle of a bottom surface of the upper cover is recessed in an upward direction to form an assembling groove. The separation module includes a fastening holder, a separation roller assembly received in the fastening holder, a torsion limiter and a sealing cover. The torsion limiter is engaged with the separation holder. The sealing cover is mounted under the fastening holder. Different separation modules detachably and changeably assembled in the assembling groove are capable of being equipped with different torsion limiters. When the scanning device scans papers of which grams are different, torsion values of the scanning device are capable of being adjusted by virtue of changing the different separation modules equipped with the different torsion limiters.

19 Claims, 7 Drawing Sheets

SCANNING DEVICE

BACKGROUND OF THE INVENTION

1. Field of the Invention

The present invention generally relates to a scanning device, and more particularly to a scanning device capable of effectively scanning papers of which grams are different.

2. The Related Art

A conventional scanning device includes an upper cover, a sealing cover, a torsion limiter and a separation module. A middle of the upper cover defines an assembling groove. The torsion limiter is fastened to the upper cover. One end of the torsion limiter projects into the assembling groove. The separation module includes a separation shaft, a separation holder and a separation roller. The separation module is mounted in the assembling groove. One end of the separation shaft is fastened to the upper cover. The other end of the separation shaft is connected with the torsion limiter. The separation holder is rotatably mounted around the separation shaft. The separation roller is mounted around the separation holder. The sealing cover opens an opening. The sealing cover is detachably mounted to the upper cover and is located outside the assembling groove. After the sealing cover is mounted to the upper cover, a bottom of the separation roller projects beyond a bottom surface of the sealing cover through the opening.

However, after the separation roller of the conventional scanning device is abraded, the sealing cover is detachable from the upper cover to take out the separation module and replace the separation roller. The torsion limiter is incapable of being replaced on account of the torsion limiter being fastened to the upper cover, when the conventional scanning device scans papers of which grams are different, namely the papers of which thicknesses are different, a torsion value of the conventional scanning device is incapable of being adjusted, when the conventional scanning device scans the thicker paper, a paper jam will be happened on account of the torsion value of the conventional scanning device being insufficient, when the conventional scanning device scans the thinner paper, paper damage will be caused on account of the torsion value of the conventional scanning device being overlarge. As a result, an image scanned by the conventional scanning device has worse quality.

Thus, in order to solve the above-mentioned problem, an innovative scanning device capable of effectively scanning papers of which grams are different is essential to be provided.

SUMMARY OF THE INVENTION

An object of the present invention is to provide a scanning device. The scanning device includes an upper cover and a separation module. A middle of a bottom surface of the upper cover is recessed in an upward direction perpendicular to the bottom surface of the upper cover to form an assembling groove. The separation module is detachably and changeably assembled in the assembling groove of the upper cover. The separation module includes a fastening holder, a separation roller assembly received in the fastening holder, a torsion limiter and a sealing cover. The separation roller assembly includes a separation shaft, a separation holder rotatably mounted around the separation shaft, and at least one separation roller mounted around the separation holder. Two opposite ends of the separation shaft are fastened to two opposite sides of the fastening holder, respectively. The torsion limiter is mounted around the separation shaft and is located at one side of the separation holder. The torsion limiter is engaged with the separation holder. The sealing cover is mounted under the fastening holder. A middle of the sealing cover opens at least one locating hole. The at least one separation roller is received in the at least one locating hole. A portion of the at least one separation roller projects beyond a bottom surface of the sealing cover along a downward direction opposite to the upward direction. Different separation modules detachably and changeably assembled in the assembling groove are capable of being equipped with different torsion limiters. When the scanning device scans papers of which grams are different, torsion values of the scanning device are capable of being adjusted by virtue of changing the different separation modules equipped with the different torsion limiters.

As described above, the different separation modules are detachably and changeably assembled in the assembling groove of the upper cover, when the scanning device scans the papers of which the grams are different, torsion values of the scanning device are capable of being adjusted by virtue of changing the different separation modules equipped with the different torsion limiters, so that the scanning device is capable of effectively scanning the papers of which the grams are different. As a result, an image scanned by the scanning device has better quality.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
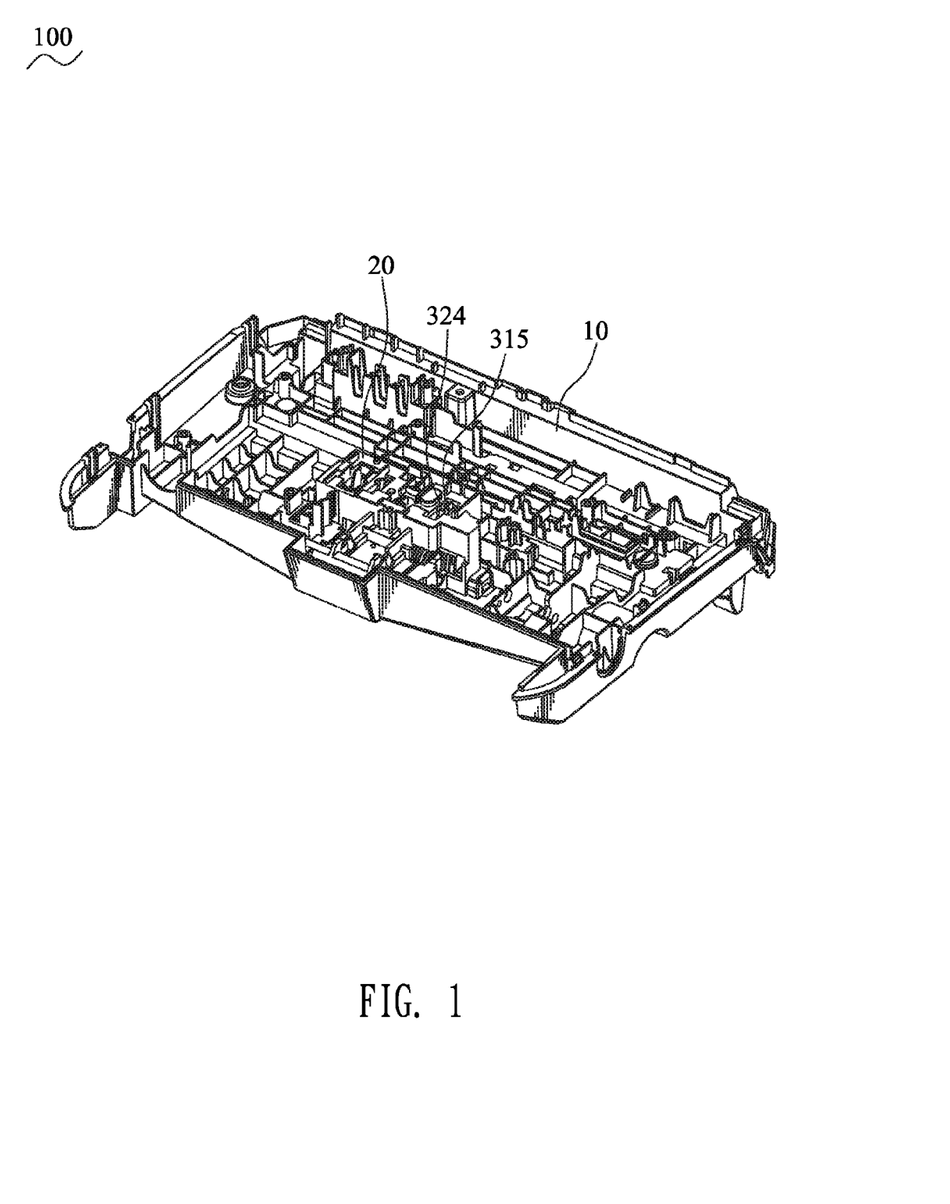
FIG. 1 is a perspective view of a scanning device in accordance with a preferred embodiment of the present invention.
Figure 2:
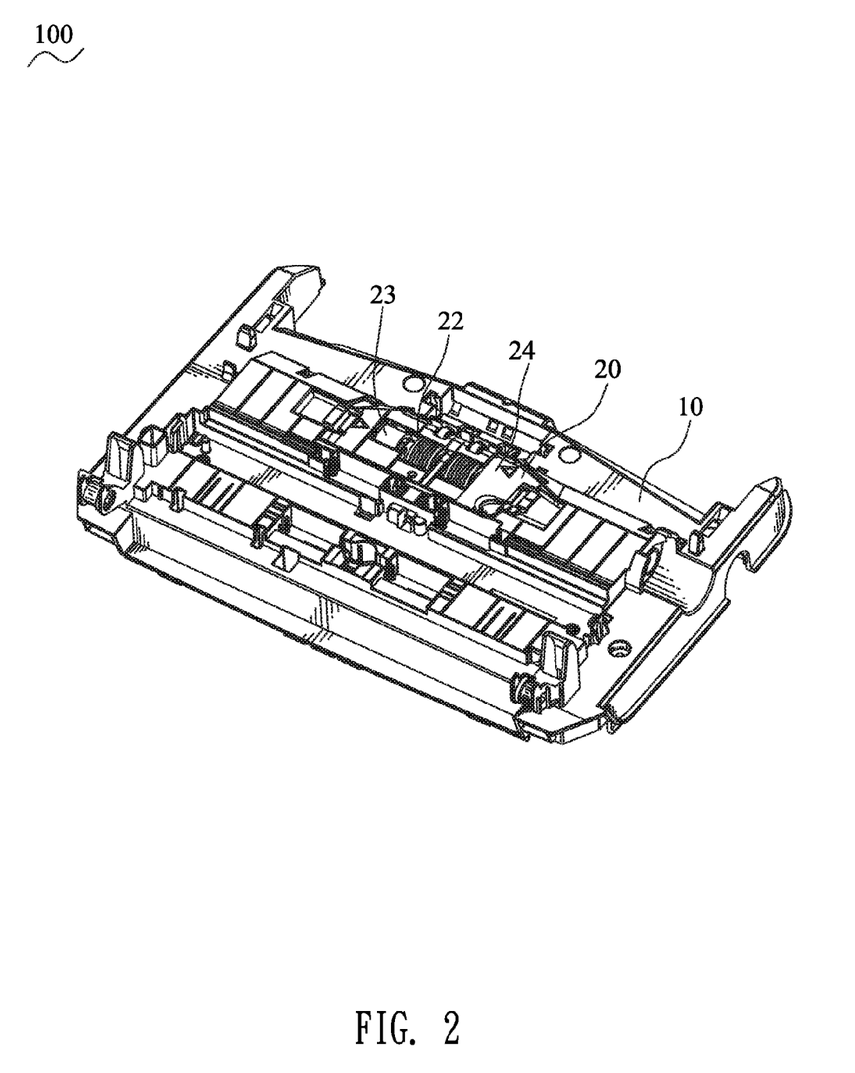
FIG. 2 is another perspective view of the scanning device of FIG. 1.

With reference to FIG. 1, a scanning device 100 in accordance with a preferred embodiment of the present invention is shown. The scanning device 100 includes an upper cover 10, and a detachably and changeable separation module 20.

Figure 3:
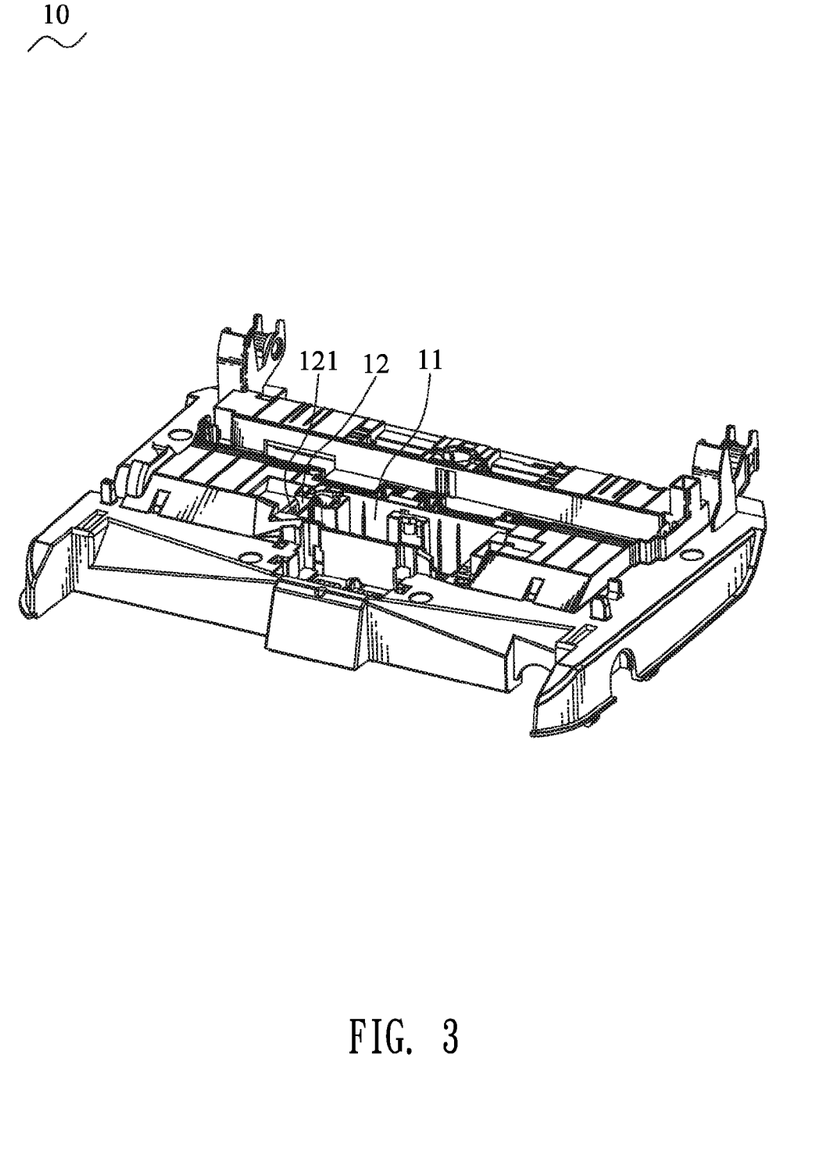
FIG. 3 is a perspective view of an upper cover of the scanning device of FIG. 1.
Figure 4:
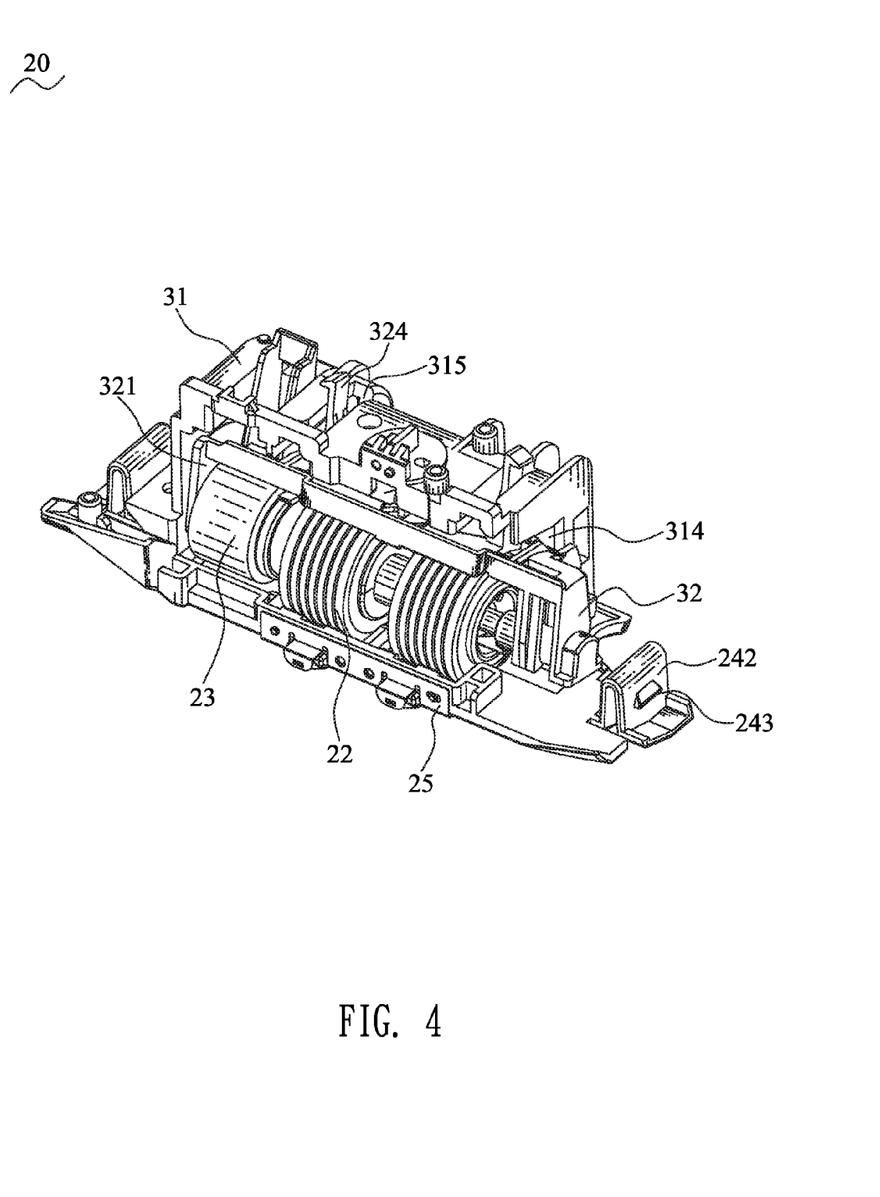
FIG. 4 is a perspective view of a separation module of the scanning device of FIG. 1.

Referring to FIG. 3, a middle of a bottom surface of the upper cover 10 is recessed in an upward direction perpendicular to the bottom surface of the upper cover 10 to form an assembling groove 11. A bottom of the assembling groove 11 among the middle of the bottom surface of the upper cover 10 is opened freely. Two opposite sides of a top wall of the assembling groove 11 opposite to the bottom of the assembling groove 11 open two fastening holes 12 arranged along a transverse direction perpendicular to the upward direction. A joint between a top wall and an outer side wall away from a center of the assembling groove 11 of each of the two fastening holes 12 defines a restricting hole 121.

Referring to FIG. 2 to FIG. 7, the separation module 20 is detachably and changeably assembled in the assembling groove 11 of the upper cover 10. The separation module 20 includes a fastening holder 21, a separation roller assembly 22, a torsion limiter 23, a sealing cover 24, a guiding element 25 and at least one rubber pad 26. In this preferred embodiment, the separation module 20 includes two rubber pads 26. Different separation modules 20 detachably and changeably assembled in the assembling groove 11 are capable of being equipped with different torsion limiters 23. Torsion limits of the torsion limiters 23 are different. Because the different separation modules 20 are detachable from the upper cover 10, when the scanning device 100 scans papers of which grams are different, torsion values of the scanning device 100 are capable of being adjusted by virtue of changing the different separation modules 20 equipped with the different torsion limiters 23, so that the scanning device 100 is capable of effectively scanning the papers of which the grams are different.

Figure 5:
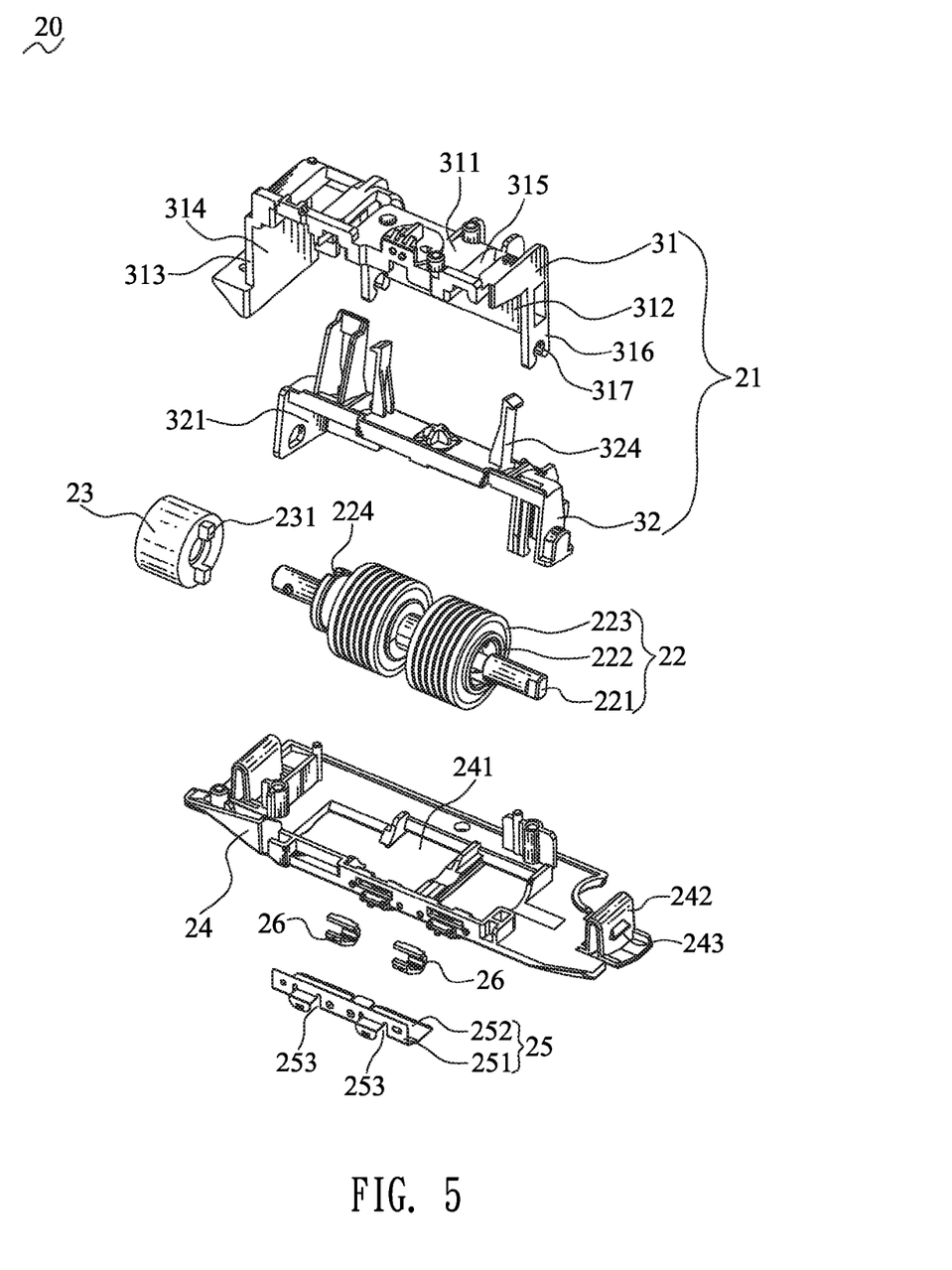
FIG. 5 is an exploded perspective view of the separation module of the scanning device of FIG. 4.
Figure 7:
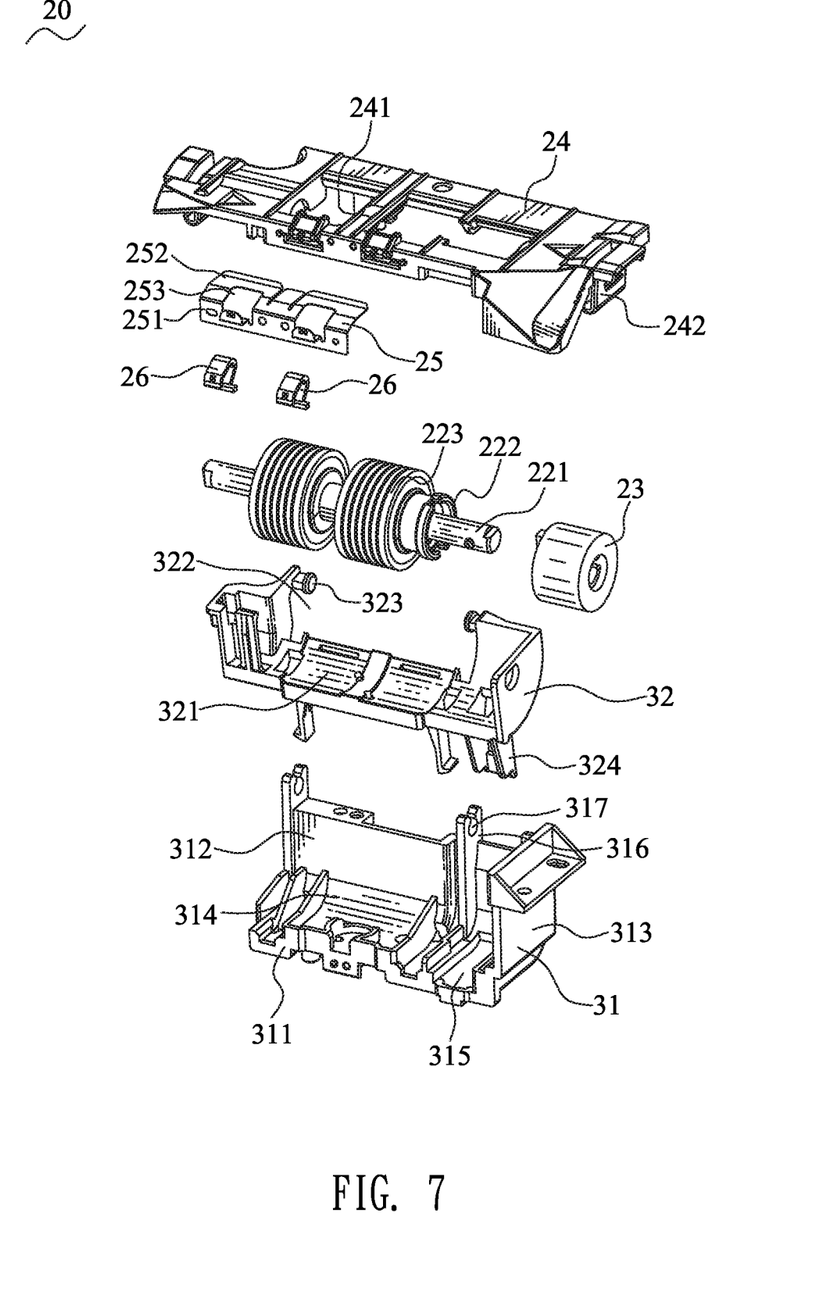
FIG. 7 is another exploded perspective view of the separation module of the scanning device of FIG. 6.

Referring to FIG. 5 and FIG. 7, the fastening holder 21 includes a fastening frame 31 and a supporting frame 32. The fastening frame 31 opens a first receiving groove 314 penetrating through a front of the fastening frame 31 in a frontward direction perpendicular to the upward direction and the transverse direction and a bottom of the fastening frame 31 in a downward direction opposite to the upward direction. Specifically, the fastening frame 31 has a top board 311, a rear board 312 extended in the downward direction opposite to the upward direction from a rear end of the top board 311 opposite to the front of the fastening frame 31, and a lateral board 313 extended in the downward direction opposite to the upward direction from one side of the top board 311 connected with the rear end of the top board 311. The first receiving groove 314 is surrounded among the top board 311, the rear board 312 and the lateral board 313. The top board 311 of the fastening frame 31 defines a plurality of locking holes 315 arranged along the transverse direction. The fastening frame 31 further includes two spaced fastening boards 316 intersecting with the rear board 312 and projecting beyond a bottom surface of the rear board 312 in the downward direction. The two fastening boards 316 are parallel to the lateral board 313. Bottom surfaces of the two fastening boards 316 located under the bottom surface of the rear board 312 of the fastening frame 31 are concaved in the upward direction to form two notches 317.

The supporting frame 32 is received in the first receiving groove 314 of the fastening frame 31. The supporting frame 32 opens a second receiving groove 321 penetrating through a bottom of the supporting frame 32 in the downward direction opposite to the upward direction and a front of the supporting frame 32 in the frontward direction perpendicular to the upward direction and the transverse direction. A middle of a rear of the supporting frame 32 located behind the second receiving groove 321 opens an opening 322 penetrating through a middle of the bottom of the supporting frame 32 in the downward direction. The opening 322 is communicated with the second receiving groove 321. Two opposite side walls of the opening 322 protrude towards each other to form two protruding pillars 323. Several portions of a top surface of the supporting frame 32 facing the top board 311 of the fastening frame 31 protrude upward to form a plurality of locking portions 324 arranged along the transverse direction. The rear of the supporting frame 32 opposite to the front of the supporting frame 32 is pivotally mounted to the fastening frame 31. Specifically, the two protruding pillars 323 are pivotally mounted in the two notches 317, respectively. The locking portions 324 are locked in the respective locking holes 315.

Referring to FIG. 5, the separation roller assembly 22 is received in the fastening holder 21. The separation roller assembly 22 is received in the second receiving groove 321. The separation roller assembly 22 includes a separation shaft 221, a separation holder 222 rotatably mounted around the separation shaft 221, and at least one separation roller 223 mounted around the separation holder 222. In this preferred embodiment, the separation roller assembly 22 includes two spaced separation rollers 223 mounted around the separation holder 222 and arranged along the transverse direction. The torsion limiter 23 is mounted around the separation shaft 221 and located at one side of the separation holder 222. The torsion limiter 23 is engaged with the separation holder 222. Two portions of one side of the torsion limiter 23 adjacent to the separation holder 222 protrude towards the separation holder 222 to form two buckling portions 231. Two portions of one side surface of the separation holder 222 facing the torsion limiter 23 are recessed sideward away from the torsion limiter 23 to form two buckling grooves 224 matched with the two buckling portions 231. The two buckling portions 231 are buckled in the two buckling grooves 224, respectively. Two opposite ends of the separation shaft 221 are fastened to two opposite sides of the fastening holder 21, respectively. Specifically, the two opposite ends of the separation shaft 221 are fastened to two opposite sides of the supporting frame 32 of the fastening holder 21, respectively.

Referring to FIG. 3 and FIG. 5, the sealing cover 24 is mounted under the fastening holder 21. The fastening holder 21 is mounted to a top surface of the sealing cover 24 facing a bottom of the fastening holder 21 which is opposite to the top board 311. A front end of the sealing cover 24 projects beyond the top surface of the sealing cover 24 and is located in front of the fastening holder 21. The sealing cover 24 is mounted under the fastening frame 31 of the fastening holder 21. A middle of the sealing cover 24 opens at least one locating hole 241. In this preferred embodiment, the middle of the sealing cover 24 opens two locating holes 241 arranged along the transverse direction.

Two opposite sides of the sealing cover 24 are arched in the upward direction to form two fastening portions 242. The two fastening portions 242 are substantially inverted U-shaped. The mouth of each of the fastening portions 242 faces towards the downward direction. A transverse distance between two opposite sides of each of the fastening portions 242 gradually becomes larger from top to bottom along the downward direction. Two outer side surfaces of the two fastening portions 242 away from the middle of the sealing cover 24 protrude outward away from each other to form two restricting blocks 243. The two fastening portions 242 are fastened in the two fastening holes 12, respectively. Each of the two restricting blocks 243 is restricted in the restricting hole 121. The at least one separation roller 223 is received in the at least one locating hole 241. A portion of the at least one separation roller 223 projects beyond a bottom surface of the sealing cover 24 opposite to the top surface of the sealing cover 24 along the downward direction. The two separation rollers 223 are received in the two locating holes 241, respectively. Two portions of the two separation rollers 223 project beyond the bottom surface of the sealing cover 24 opposite to the top surface of the sealing cover 24 along the downward direction.

Figure 6:
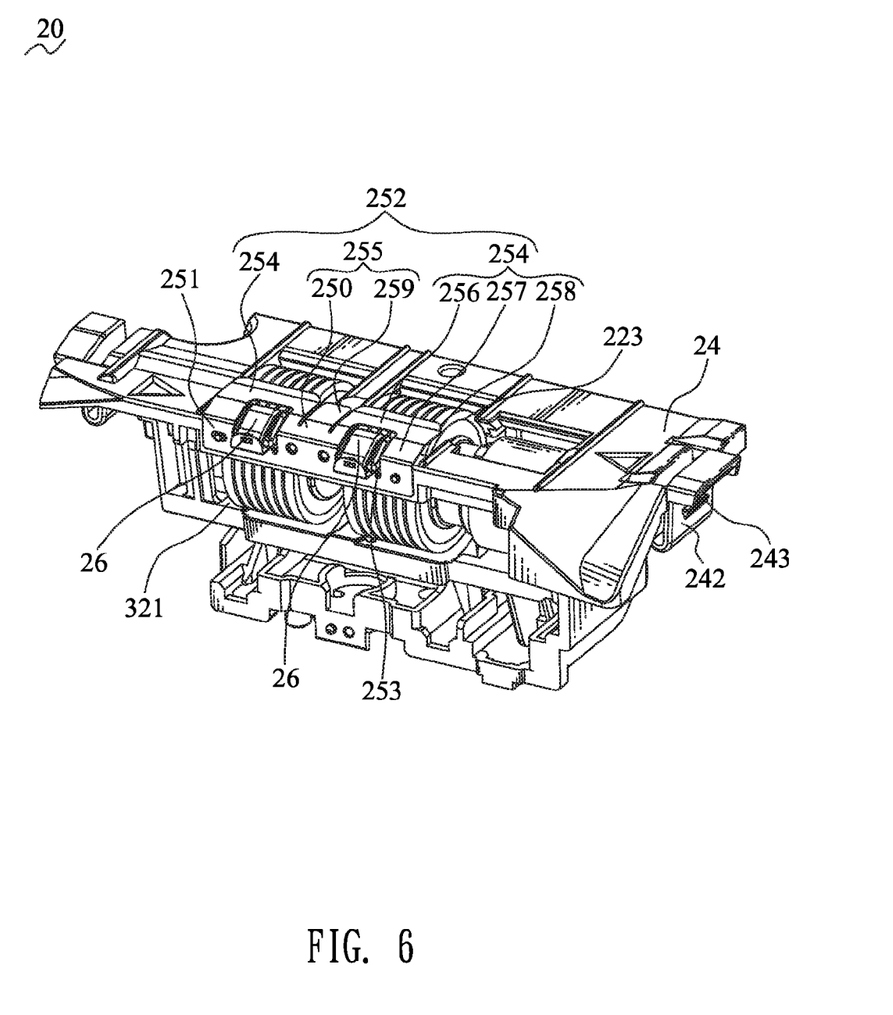
FIG. 6 is another perspective view of the separation module of the scanning device of FIG. 4.

Referring to FIG. 5 to FIG. 7, the guiding element 25 is mounted to the front end of the sealing cover 24. The guiding element 25 has a guiding slice 252, and a fastening slice 251 extended in the upward direction from a front edge of the guiding slice 252 located in front of the separation roller assembly 22. A bottom edge of the fastening slice 251 is connected with the front edge of the guiding slice 252. The fastening slice 251 is fastened to a front surface of the sealing cover 24 located in front of the fastening holder 21. The guiding slice 252 is located under the bottom surface of the sealing cover 24 opposite to the top surface of the sealing cover 24. A front of the at least one separation roller 223 adjacent to the front end of the sealing cover 24 is located above the guiding slice 252. The guiding element 25 opens at least one receiving hole 253. A joint between the fastening slice 251 and the guiding slice 252 opens the at least one receiving hole 253. Specifically, the guiding element 25 opens two receiving holes 253 arranged along the transverse direction. Two opposite sides of the joint between the fastening slice 251 and the guiding slice 252 open the two receiving holes 253 arranged along the transverse direction.

The guiding slice 252 includes two first guiding slices 254, and a second guiding slice 255 located between the two first guiding slices 254. Front ends of the two separation rollers 223 adjacent to the front end of the sealing cover 24 are located above the two first guiding slices 254, respectively. A portion of the bottom surface of the sealing cover 24 located between the two portions of the two separation rollers 223 projecting beyond the bottom surface of the sealing cover 24 is located above the second guiding slice 255.

Each of the two first guiding slices 254 has a first base slice 256 parallel to the bottom surface of the sealing cover 24, a first extending slice 257 slantwise extended along the upward direction and the frontward direction from one end of the first base slice 256, and a second extending slice 258 slantwise extended opposite to the first extending slice 257 from the other end of the first base slice 256. A free end of the first extending slice 257 is connected with the bottom edge of the fastening slice 251. The second guiding slice 255 has a second base slice 259 parallel to the bottom surface of the sealing cover 24, and a third extending slice 250 connected between the second base slice 259 and the fastening slice 251, and slantwise extended along the upward direction and the frontward direction. The third extending slice 250 is connected between the first extending slices 257 of the two first guiding slices 254. Front ends of the two separation rollers 223 adjacent to the front end of the sealing cover 24 are located above the first base slices 256, the first extending slices 257 and the second extending slices 258 of the two first guiding slices 254, respectively. The portion of the bottom surface of the sealing cover 24 located between the two portions of the two separation rollers 223 projecting beyond the bottom surface of the sealing cover 24 is located above the second base slice 259 and the third extending slice 250 of the second guiding slice 255.

The at least one rubber pad 26 is fastened to the front end of the sealing cover 24 located in front of the fastening holder 21. The at least one rubber pad 26 is located in front of the portion of the at least one separation roller 223 projecting beyond the bottom surface of the sealing cover 24. The at least one rubber pad 26 is received in the at least one receiving hole 253. Specifically, the two rubber pads 26 are fastened to the front end of the sealing cover 24 and arranged along the transverse direction. The two rubber pads 26 are located in front of the two portions of the two separation rollers 223 projecting beyond the bottom surface of the sealing cover 24, respectively. The two rubber pads 26 are received in the two receiving holes 253, respectively. The rubber pads 26 are used for separating the papers to be scanned piece by piece in advance.

As described above, the different separation modules 20 are detachably and changeably assembled in the assembling groove 11 of the upper cover 10, when the scanning device 100 scans the papers of which the grams are different, the torsion values of the scanning device 100 are capable of being adjusted by virtue of changing the different separation modules 20 equipped with the different torsion limiters 23, so that the scanning device 100 is capable of effectively scanning the papers of which the grams are different. As a result, an image scanned by the scanning device 100 has better quality.

What is claimed is:

1. A scanning device, comprising:
an upper cover, a middle of a bottom surface of the upper cover being recessed in an upward direction perpendicular to the bottom surface of the upper cover to form an assembling groove; and
a separation module detachably and changeably assembled in the assembling groove of the upper cover, the separation module including:
a fastening holder,
a separation roller assembly received in the fastening holder, the separation roller assembly including a separation shaft, a separation holder rotatably mounted around the separation shaft, and at least one separation roller mounted around the separation holder, two opposite ends of the separation shaft being fastened to two opposite sides of the fastening holder, respectively,
a torsion limiter mounted around the separation shaft and located at one side of the separation holder, the torsion limiter being engaged with the separation holder, and
a sealing cover mounted under the fastening holder, a middle of the sealing cover opening at least one locating hole, the at least one separation roller being received in the at least one locating hole, a portion of the at least one separation roller projecting beyond a bottom surface of the sealing cover along a downward direction opposite to the upward direction;
wherein different separation modules detachably and changeably assembled in the assembling groove are capable of being equipped with different torsion limiters, when the scanning device scans papers of which grams are different, torsion values of the scanning device are capable of being adjusted by virtue of changing the different separation modules equipped with the different torsion limiters.

2. The scanning device as claimed in claim 1, wherein torsion limits of the torsion limiters are different.

3. The scanning device as claimed in claim 1, wherein the fastening holder includes a fastening frame and a supporting frame, the fastening frame opens a first receiving groove penetrating through a front of the fastening frame in a frontward direction perpendicular to the upward direction and a transverse direction and a bottom of the fastening frame in the downward direction opposite to the upward direction, the supporting frame is received in the first receiving groove.

4. The scanning device as claimed in claim 3, wherein the sealing cover is mounted under the fastening frame of the fastening holder.

5. The scanning device as claimed in claim 3, wherein the supporting frame opens a second receiving groove penetrating through a bottom of the supporting frame in the downward direction opposite to the upward direction and a front of the supporting frame in the frontward direction perpendicular to the upward direction and the transverse direction, the separation roller assembly is received in the second receiving groove, the two opposite ends of the separation shaft are fastened to two opposite sides of the supporting frame, respectively.

6. The scanning device as claimed in claim 5, wherein a rear of the supporting frame opposite to the front of the supporting frame is pivotally mounted to the fastening frame.

7. The scanning device as claimed in claim 5, wherein the fastening frame has a top board, a rear board extended in the downward direction from a rear end of the top board opposite to the front of the fastening frame, and a lateral board extended in the downward direction from one side of the top board connected with the rear end of the top board, the first receiving groove is surrounded among the top board, the rear board and the lateral board.

8. The scanning device as claimed in claim 7, wherein the fastening frame further includes two spaced fastening boards intersecting with the rear board and projecting beyond a bottom surface of the rear board in the downward direction, bottom surfaces of the two fastening boards located under the bottom surface of the rear board are concaved in the upward direction to form two notches, a middle of a rear of the supporting frame located behind the second receiving groove opens an opening penetrating through a middle of the bottom of the supporting frame in the downward direction, the opening is communicated with the second receiving groove, two opposite side walls of the opening protrude towards each other to form two protruding pillars, the two protruding pillars are pivotally mounted in the two notches, respectively.

9. The scanning device as claimed in claim 7, wherein the top board of the fastening frame defines a plurality of locking holes arranged along the transverse direction, several portions of a top surface of the supporting frame facing the top board of the fastening frame protrude upward to form a plurality of locking portions arranged along the transverse direction, the locking portions are locked in the respective locking holes.

10. The scanning device as claimed in claim 1, wherein a bottom of the assembling groove among the middle of the bottom surface of the upper cover is opened freely, two opposite sides of a top wall of the assembling groove opposite to the bottom of the assembling groove open two fastening holes arranged along a transverse direction perpendicular to the upward direction, two opposite sides of the sealing cover are arched in the upward direction to form two fastening portions, the two fastening portions are fastened in the two fastening holes, respectively.

11. The scanning device as claimed in claim 10, wherein the two fastening portions are substantially inverted U-shaped.

12. The scanning device as claimed in claim 10, wherein a joint between a top wall and an outer side wall away from a center of the assembling groove of each of the two fastening holes defines a restricting hole, two outer side surfaces of the two fastening portions away from the middle of the sealing cover protrude outward away from each other to form two restricting blocks, each of the two restricting blocks is restricted in the restricting hole.

13. The scanning device as claimed in claim 1, wherein the separation module further includes at least one rubber pad fastened to a front end of the sealing cover located in front of the fastening holder, the at least one rubber pad is located in front of the portion of the at least one separation roller projecting beyond the bottom surface of the sealing cover.

14. The scanning device as claimed in claim 1, wherein the separation module further includes a guiding element mounted to a front end of the sealing cover located in front of the fastening holder.

15. The scanning device as claimed in claim 14, wherein the guiding element has a guiding slice, and a fastening slice extended in the upward direction from a front edge of the guiding slice located in front of the separation roller assembly, the fastening slice is fastened to a front surface of the sealing cover located in front of the fastening holder, the guiding slice is located under the sealing cover, a front of the at least one separation roller adjacent to the front end of the sealing cover is located above the guiding slice.

16. The scanning device as claimed in claim 14, wherein the separation module further includes at least one rubber pad, the guiding element opens at least one receiving hole, the at least one rubber pad is received in the at least one receiving hole.

17. The scanning device as claimed in claim 14, wherein the separation module further includes two rubber pads, the guiding element opens two receiving holes arranged along a transverse direction, the two rubber pads are received in the two receiving holes, respectively.

18. The scanning device as claimed in claim 1, wherein the separation roller assembly includes two spaced separation rollers mounted around the separation holder and arranged along a transverse direction, the middle of the sealing cover opens two locating holes arranged along the transverse direction, the two separation rollers are received in the two locating holes, respectively, two portions of the two separation rollers project beyond the bottom surface of the sealing cover along the downward direction.

19. The scanning device as claimed in claim 18, wherein the separation module further includes two rubber pads, the two rubber pads are fastened to a front end of the sealing cover and arranged along the transverse direction, the two rubber pads are located in front of the two portions of the two separation rollers projecting beyond the bottom surface of the sealing cover, respectively.

\* \* \* \* \*